Oct. 19, 1943.       S. E. BUCKLEY       2,332,201
METHOD FOR RECOVERING LIQUIDS FROM GASES
Filed March 31, 1941        2 Sheets-Sheet 1

Stuart E. Buckley INVENTOR.

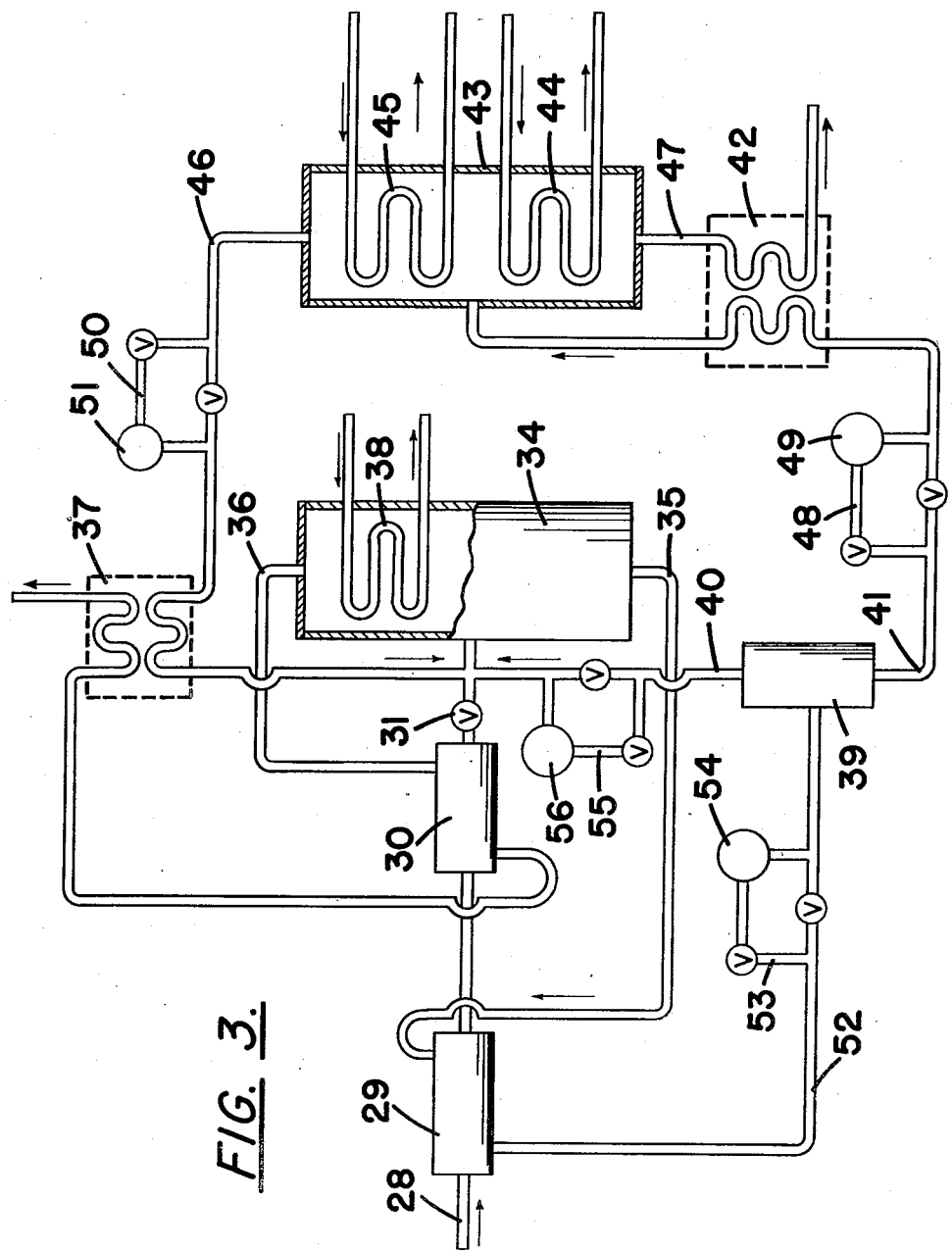

Patented Oct. 19, 1943

2,332,201

UNITED STATES PATENT OFFICE 2,332,201

METHOD FOR RECOVERING LIQUIDS FROM GASES

Stuart E. Buckley, Houston, Tex., assignor to Standard Oil Development Company, a corporation of Delaware Application March 31, 1941, Serial No. 386,047

9 Claims. (Cl. 62—175.5)

The present invention is directed to a method for recovering normally liquid constituents from gases and is a division of the invention disclosed in my copending application Ser. No. 265,095, filed March 31, 1939, now Patent No. 2,242,173 issued May 13, 1941. More specifically, this invention is directed to the recovery of gasoline from natural gas and from refinery gases of a composition similar to that of natural gas.

Natural hydrocarbon gas from different sources contains varying amounts of normally liquid hydrocarbons which are desirable constituents of gasoline. These gases are usually produced at high pressures ranging upwardly of 1000 pounds per square inch. At these pressures and at ordinary temperatures certain phase laws operate which render recovery of the normally liquid constituents by the conventional scrubbing methods difficult or impractical, since, under these conditions, although the gas may contain a substantial percentage of normally liquid components, the gas as a whole has the characteristics of a dry gas. Accordingly, it has been the custom to reduce the gas pressure considerably, so as to make possible a substantial recovery of normally liquid constituents by scrubbing.

On the other hand, it is frequently desirable to recover the normally dry gas at a high pressure, because this gas is frequently used for repressuring the producing substrata. Moreover, it is desirable from an economic point of view to conserve the pressure energy of this gas for useful purposes whether or not it is to be used for repressuring. When the gas is to be used for repressuring, precompression of it before introduction into the producing substrata is necessary and for this reason the important factor to be considered is that the cost of compressing a gas to a certain final pressure multiplies rapidly as the initial pressure of the gas decreases. Accordingly, it is desirable to recover the normal liquid constituents from the gas with as small a reduction of pressure of the gas as is possible, consistent with an economic recovery of liquid constituents. That is to say, a balance must be struck between the cost of recompressing the gas and the value of the recovered liquid constituents.

The principal object of the present invention is the provision of a method for recovering normally liquid constituents from gases under high pressure with a minimum reduction in the pressure of gas.

An additional object is the provision of a method of the character described which can be carried out with simplified equipment and with lower operating and maintenance cost with a maximum utilization of the energy contained in the gas.

Still another object of the present invention is the provision of a method of the character described in which the pressure on the liquid condensate is utilized to produce refrigeration in the further stabilization of this liquid condensate.

A further object of the present invention is the provision of a method of the character described in which the normally dry gas which is dissolved in the liquid condensate recovered is removed from this condensate and subjected to a treatment for the recovery therefrom of condensable constituents which it carries off from the condensate.

Further objects and advantages of the present invention will appear from the following detailed description of the accompanying drawings in which:

Figure 3 is a front elevation in diagrammatic form of a different apparatus suitable for effecting the same results.

Figure 1:
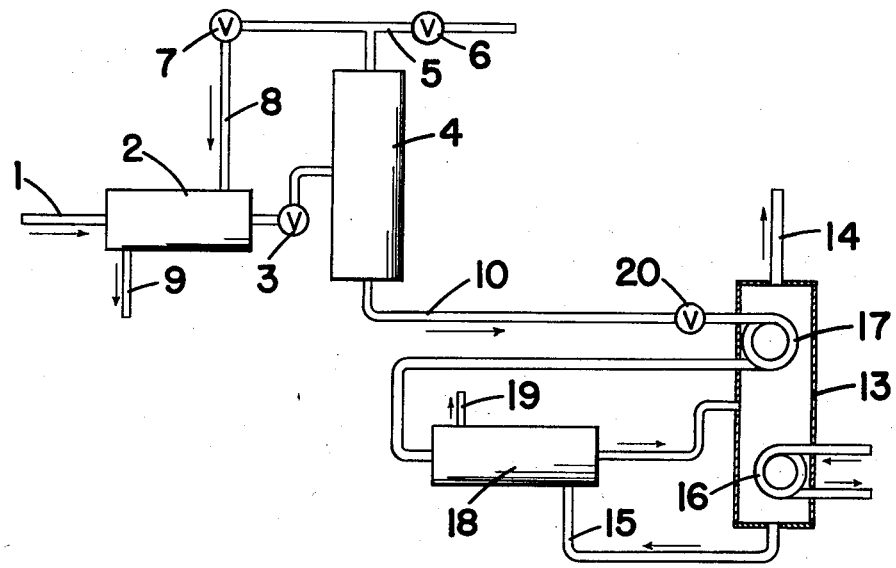
Figure 1 is a front elevation of a section of an apparatus suitable for carrying out that step of the present invention according to which the high pressure of the condensate is utilized in the stabilization of the condensate.

In Fig. 1 are applied suitable legends from which the nature of the method of the present invention is evident. Briefly, the method consists in conducting high pressure gas from a deposit or from the separator of a refinery plant, which should first be dehydrated by any conventional method or by the method hereinafter described, through a pipe 1, a heat exchanger 2, and an expansion valve 3 into a separator 4, which is maintained at a pressure and temperature within the limits defined hereinafter. The dry gas leaves the separator through a drawoff line 5, which is provided with a valve 6 and leads to a compressor or to any other piece of equipment in which the gas is utilized. If it is desired to precool the feed gas, valve 6 is closed and vavle 7 in a branch line 8, leading to the heat exchanger 2, is opened, whereby the cool gas passes in heat exchange relation with the incoming gas. The dry gas leaves the heat exchanger through pipe 9 which is connected to the same equipment as line 6. The liquid products recovered in separator 4 are drawn off through line 10 and conducted to a stabilizer.

Stabilization tower 13 is provided with a gas drawoff 14 at its upper end which may discharge into feed line 1, and a liquid drawoff 15 at its lower end. It is also provided with a steam coil 16 for vaporizing undesired constituents at the pressure employed. The chief undesired constituents are propane and lower hydrocarbons, and a certain percentage of the butane which must be removed in order to reduce the vapor pressure of the gasoline to the desired amount. Line 10 carries cold high pressure distillate containing the undesired constituents into the top of tower 13 in which it is passed into a coil 17, and then back out to a heat exchanger 18 where it is passed in heat exchange relation to the stabilized gasoline which has been heated up by the steam coil carried in line 15. The stabilized condensate is withdrawn from the heat exchanger by line 19. Prior to its entry into the tower the unstable condensate is passed through an expansion valve 20 which causes expansion of this condensate and its gaseous constituents in coil 17 with consequent cooling. By this expedient the pressure of the condensate and the included gases is utilized to produce reflux in the top of the stabilizer by reducing the temperature of coil 17 to any desired point, and easily to the temperature required to maintain the composition of the overhead so that it contains nothing higher than butane.

Figure 2:
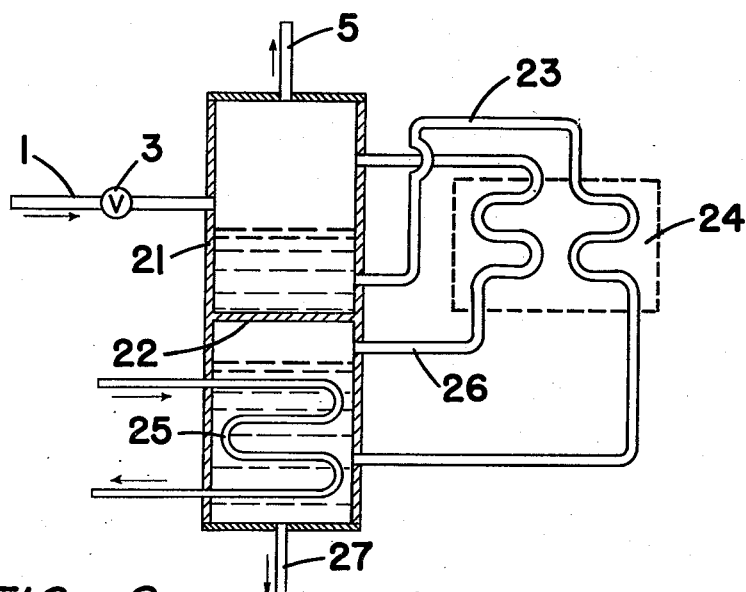
Figure 2 is a front elevation, partly in section, of one type of apparatus suitable for recovering dry gas dissolved in the condensate and introducing this gas into the first condensing zone.

In Figure 2 is shown a tower which enables the operator to recover the dry gas which has been dissolved in the condensate from the condensate without a loss of its pressure. The tower shown in Fig. 2 is indicated by numeral 21 and is provided with a partition 22 intermediate its ends dividing it into two zones. The wet gas is introduced into the upper zone through line 1 and expansion valve 3 and with the zone maintained under conditions hereinafter specified the condensate collects at the bottom thereof, while dry gas passes off at the top through line 5. The condensate is withdrawn through line 23 and passes through heat exchanger 24 into the lower end of the bottom zone which contains a steam coil 25, which is supplied with steam at a suitable temperature to drive off normally gaseous constituents of the condensate at the pressure maintained in the system. The gases so driven off are withdrawn from the lower section through line 26 and passed in heat exchange relation to the liquid withdrawn from the upper zone, and are then discharged into the upper end of the upper zone to join the dry gas leaving the system through line 5. The condensate, with a reduced content of normally gaseous constituents, such as methane and ethane, is withdrawn from the lower section through line 27.

In the system shown in Fig. 3 the object is to recover dry gas which has been dissolved in the condensate and at the same time stabilize the condensate without the loss in the dry gas of constituents, such as propane and butane, which may be desired for some other purpose. In this system the rich gas is introduced through line 28 into a heat exchanger 29 where it gives up heat to the condensate initially produced, and is then passed through a second heat exchanger 30 where it gives up heat to the dry gas initially produced, and then passes through expansion valve 31 into the separator 34. The condensate is withdrawn from the separator through line 35 and passed to heat exchanger 29, while dry gas is withdrawn from the separator through line 36 and passed through heat exchanger 30, and then to a second heat exchanger 37 hereinafter referred to. Separator 34 is provided at its upper end with a cooling coil 38 which need not be used if sufficient temperature reduction can be secured by expansion of the wet gas.

The condensate leaving tower 34 contains some dry gas dissolved therein, and this condensate is heated up in heat exchanger 29 and then passes through line 52 to a flash drum 39 from the upper end of which the dry gas passes off through line 40. This dry gas inevitably carries off some desirable constituents with it, so it is added to the feed stock at the low pressure side of expansion valve 31. The remainder of the condensate is withdrawn from drum 39 through line 41 and is discharged through a heat exchanger 42 into a stabilization drum 43. Stabilizer 43 is provided at its bottom with a heating coil 44 and at its top with a cooling coil 45. The overhead from the stabilizer passes off through line 46 to heat exchanger 37 here it is cooled by the dry gas withdrawn from separator 34, and is then combined with the fresh feed at the low pressure side of expansion valve 31.

Stabilized liquid is withdrawn from the bottom of stabilizer 43 through line 47, and is conducted to a heat exchanger 42, where it imparts its heat to the incoming condensate. Line 41 is provided with a bypass 48 containing a pump 49, while line 46 is provided with a bypass 50 containing a compressor 51. Since it is desirable to have the dry gas from the whole system at the pressure maintained in separator 34, it is necessary either to compress the condensate from flash drum 39 and to operate the stabilizer 43 at this pressure, or to compress the overhead from the stabilizer. The former is generally the more economical procedure.

In order to impart flexibility to the system, line 52 is provided with a bypass 53 in which is a pump 54, and line 40 is provided with a bypass 55 in which is a compressor 56. Thus separator 39 may be operated at fairly low pressures, and the gases resulting therefrom are compressed in compressor 56, and the liquids pumped by pump 49 into stabilizer 43. Alternatively, stabilizer 43 can also be operated at low pressure and the gases resulting therefrom compressed by compressor 51. Or by the use of pump 54, the separator 39 may be operated at relatively high pressure and the stabilizer 43 at relatively low pressure.

As can be seen, the system illustrated in Figure 3 utilizes to the fullest extent the energy contained in the various components of the initial mixture, and yields a stabilized gasoline and a dry gas at a high pressure. It will be understood that the condensate line in Figure 3, instead of going to the first heat exchanger, can go to the stabilizing tower as shown in Figure 1.

From the above description, it will be apparent that the present invention relates to the recovery of condensable constituents from high pressure gases containing them, the recovery to be effected usually at a pressure of at least 500 pounds per square inch. The operation is preferably conducted at a pressure of at least 700 pounds per square inch and may be conducted at pressures as high as 1200 pounds per square inch, provided the initial wet gas is available at pressures substantially in excess of 1200 pounds per square inch, such as 2000 pounds per square inch which is quite common in many fields. The separator may be maintained at any convenient temperature of between about —50° F. and +60° F., the lower temperatures in this case being rather cheaply attained, when the wet gas is at a sufficiently high pressure, by expansion of the gas to the separation pressure with suitable heat exchange.

In the appended drawings apparatus has been shown in which the high pressure gas is expanded in the separator so that the desired temperature in the separator can be attained. In some cases the initial gas is not at sufficiently high pressure to produce the desired low temperature merely by expansion to the operating pressure. In this case it will be evident that the temperature of the separator may be maintained by extraneous refrigeration, such as by the employment of cooling coils such as shown in Fig. 3.

The method, as practiced in the various types of apparatus shown in the drawings, consists in taking a gas, containing normally liquid constituents, above the desired separation temperature, preferably dehydrating the gas, cooling the gas initially to a lower temperature and then releasing the pressure on the gas to bring it to the desired separation pressure and temperature. It will be understood that no particular order of steps is necessary in arriving at the separation conditions. The important point is the arrival at the separation conditions and the maintenance of these conditions. Thus, for example, the gas can initially be expanded to the separation pressure and then cooled, if further cooling is necessary, to the separation temperature. Conversely, the gas may be cooled wholly by expansion without the aid of heat exchangers or extraneous refrigeration.

It will be apparent that the apparatus shown in the various figures is merely illustrative and may be changed substantially without departing from the scope of the present invention. Mention may be made of the fact that all of the low temperature vessels should be encased with a heavy lagging so as to conserve energy to the greatest possible extent.

The nature and objects of the present invention having been thus described and illustrated, what is claimed as new and useful and is desired to be secured by Letters Patent is:

1. The method of recovering desirable liquefiable constituents from gas which is initially at a high pressure substantially above the lower limit of the range of pressure in which said constituents undergo retrograde condensation which comprises expanding said gas to a lower pressure within the retrograde range into a condensation zone, effecting a drop in temperature in said zone sufficient to liquefy said liquefiable constituents, withdrawing said liquefiable constituents and introducing them into a zone maintained at a higher temperature in which dissolved gases are dispelled, and reintroducing the gases so dispelled into said condensation zone.

2. The method of recovering desirable liquefiable constituents from gas which is initially at a high pressure which comprises expanding said gas into an enclosed zone separate from and contained in the upper part of a condensation zone, whereby a temperature drop is effected in said enclosed zone, and then discharging said gas into a lower section of said condensation zone to thereby utilize said temperature drop in the enclosed zone to liquefy at least part of said liquefiable constituents.

3. The method of recovering desirable liquefiable constituents from gas which is initially at a high pressure substantially above the lower limit of the range of pressure in which said constituents undergo retrograde condensation which comprises expanding said gas to a lower pressure within the retrograde range into a condensation zone maintained at a temperature suitable for the condensation of said liquefiable constituents, withdrawing the condensed constituents from said zone, passing them into heat exchange relation with said gas before its expansion, recovering dry gases from the top of said zone, discharging the condensed constituents after they have taken up heat from the feed gas into a stabilizing zone, recovering rich gas and stabilized condensate from said zone, and introducing said rich gas into said condensation zone.

4. The method according to the preceding claim in which the dry gases recovered from the condensation zone are passed into heat exchange relation into the initial gas before its expansion.

5. The method of recovering desirable liquefiable constituents from gas which is initially at a high pressure substantially above the lower limit of the range of pressure in which said constituents undergo retrograde condensation, which comprises initially cooling said gas, expanding the gas into a condensation zone to a lower pressure within the retrograde range whereby the liquefiable constituents are condensed and a dry residue gas is obtained, removing the condensed constituents to a separate zone without any substantial drop in pressure and heating said constituents after they leave said condensation zone whereby further dry gas is recovered from said constituents in said second zone.

6. A method for recovering desirable liquefiable constituents from gas which is initially at a high pressure substantially above the lower limit of the range of pressure in which said constituents undergo retrograde condensation, which comprises establishing two zones each having a liquid space and a vapor space, establishing separate fluid communications between the two vapor spaces and the two liquid spaces respectively, expanding said gas into one of said zones whereby a low temperature is created therein and liquid is deposited in the liquid space thereof, conducting said liquid to the liquid space of said second zone, there applying heat to it and conducting evolved vapor from the vapor space of the said second zone to the vapor space of said first zone.

7. The method of recovering desirable liquefiable constituents from gas which is initially at a high pressure substantially above the lower limit of the retrograde condensation pressure range of said constituents, which comprises expanding said gas into a condensation zone to a lower pressure within said retrograde range, whereby a drop in temperature sufficient to liquefy at least part of said liquefiable constituents occurs, withdrawing said liquefied constituents and introducing them into a zone maintained at a higher temperature in which dissolved gases are dispelled, and reintroducing the gases so dispelled into said condensation zone.

8. The method of recovering desirable liquefiable constituents from gas which is initially at a high pressure substantially above the lower limit of the retrograde condensation pressure range of said constituents, which comprises expanding said gas to a lower pressure within said retrograde range into a condensation zone maintained at a temperature suitable for the condensation of said liquefiable constituents, withdrawing the condensed constituents from said zone, passing them into heat exchange relation with said gas before its expansion, recovering dry gases from the top of said zone, discharging the condensed constituents after they have taken up heat from the feed gas into a stabilizing zone, recovering rich gas and stabilized condensate from said zone, and introducing said rich gas into said condensation zone.

9. An apparatus for the recovery of liquefiable constituents from a high pressure gas comprising a chamber, a coil in the upper portion of said chamber, an inlet for said gas into said coil, pressure reducing means in said inlet, means for discharging fluid from said coil into said chamber at a lower point therein and means for separately withdrawing liquid and gas from said chamber.

STUART E. BUCKLEY.